United States Patent [19]

Handley et al.

[11] 4,308,886
[45] Jan. 5, 1982

[54] CURB BOX

[75] Inventors: Edward W. Handley, Jackson; Richard E. Hammond, Rives Junction; Robert E. Diffenderfer, Jackson, all of Mich.

[73] Assignee: Handley Industries, Inc., Jackson, Mich.

[21] Appl. No.: 97,655

[22] Filed: Nov. 27, 1979

[51] Int. Cl.³ .............................................. F16K 27/00
[52] U.S. Cl. .................................... 137/365; 137/364; 137/370
[58] Field of Search ............... 137/364, 365, 366, 367, 137/368, 369, 370, 371

[56] References Cited

U.S. PATENT DOCUMENTS

| | | | |
|---|---|---|---|
| 1,108,031 | 8/1914 | Tyler et al. | 137/368 |
| 1,608,772 | 11/1926 | Cole | 137/365 |
| 3,548,864 | 12/1970 | Handley et al. | |
| 3,601,143 | 8/1971 | Glennon | |
| 4,030,519 | 6/1977 | Zinn | |
| 4,239,056 | 12/1980 | Shope | 137/370 |

Primary Examiner—Gerald A. Michalsky
Attorney, Agent, or Firm—Beaman & Beaman

[57] ABSTRACT

A curb box for underground gas and water services formed of a synthetic plastic material wherein the lower portion of the curb box is formed with a bell housing for receiving a service or distribution line valve. The bell housing includes valve engaging surfaces frictionally contacting the valve wherein such frictional engagement initially positions the valve upon the curb box and resists inadvertent displacement between the valve and curb box during installation, back filling and settling.

1 Claim, 6 Drawing Figures

U.S. Patent        Jan. 5, 1982        4,308,886
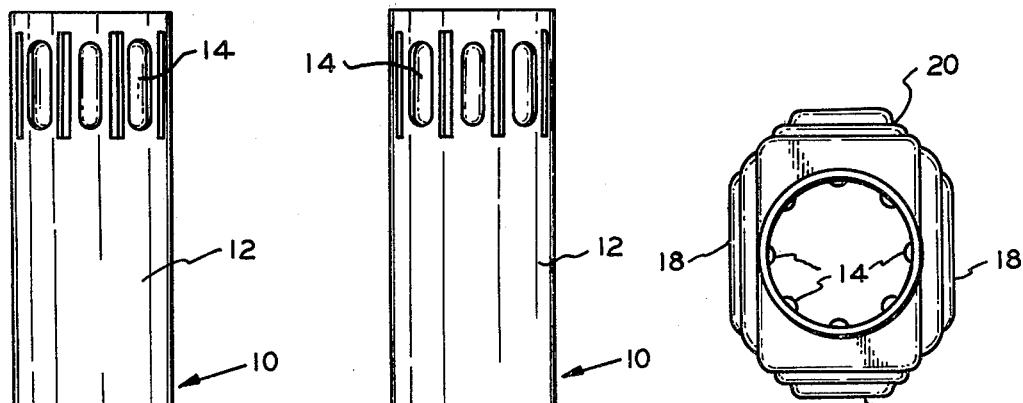
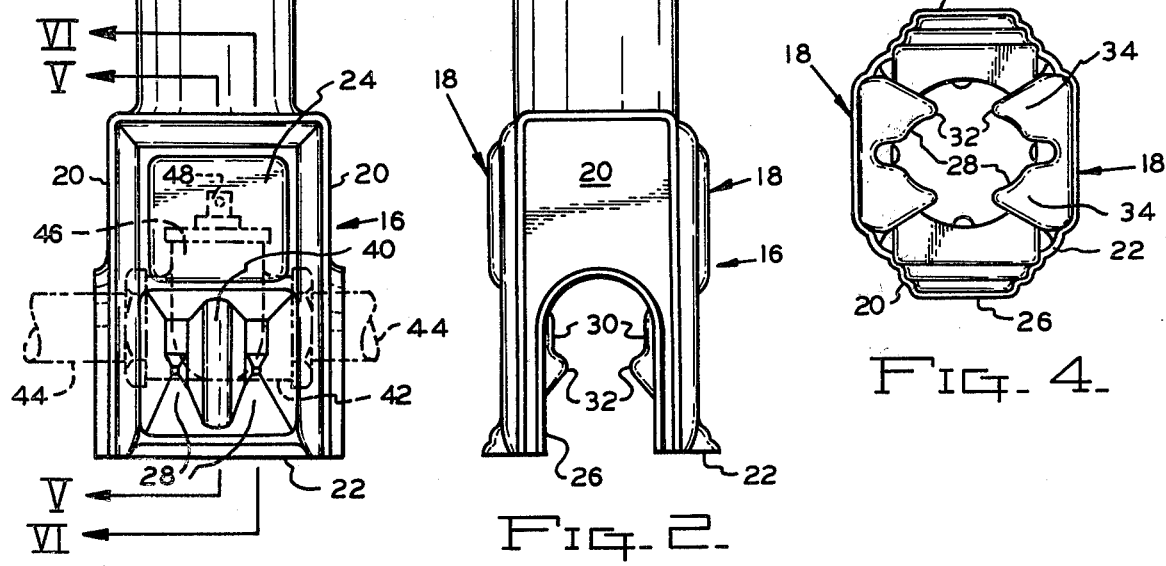
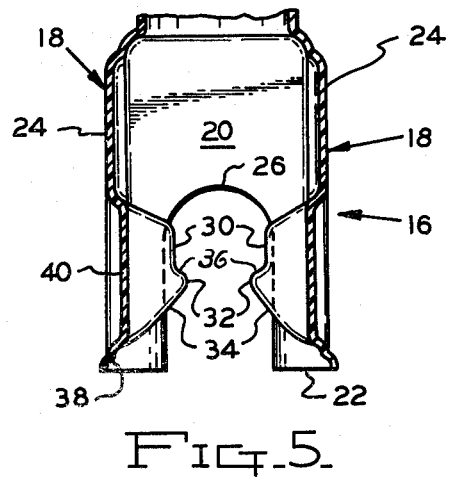
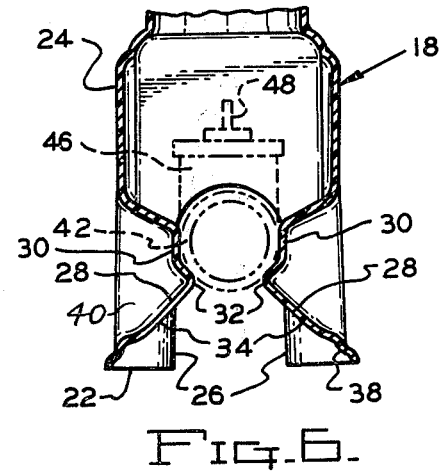

CURB BOX

BACKGROUND OF THE INVENTION

Curb boxes are widely employed to provide access to buried utility service and distribution lines such as gas and water systems, and many curb boxes are formed of a pair of synthetic plastic components frictionally telescoped with respect to the vertical dimension for accommodation to the depth of the service or distribution line and protection against damage to the lines upon a vertical force being applied to the curb box cover. An example of such a curb box, and the method of forming the same, is shown in the assignee's U.S. Pat. No. 3,548,864.

When installing a curb box, an open trench exists in which the conduit and associated valve is laid. The curb box is placed over the valve, and the trench is back filled. During the back filling procedure it is important that the curb box remain properly located with respect to the valve, and even though the back filling may be by bulldozers, back hoes or other power equipment, the curb box must stay positioned on the valve even though subjected to lateral forces and pressures while being covered. Bases have been employed with curb boxes as disclosed in the above identified patent, and as it is desired that the curb box protect the valve from vertical forces imposed upon the curb box it is desirable that the vertical support of the curb box be sufficient to prevent such vertical forces from being directly imposed on the valve so that telescoping of the curb box components may take place prior to damaging the valve and conduit system.

Synthetic plastic curb boxes are known which are of the "snap-on" type whereby the curb box may be frictionally positioned on the conduit system by a vertical downward force. In such constructions the resilient nature of the bell housing material permits portions of the curb box bell housing to be forced outwardly as the bell housing is forced over the pipe through a restricted dimension, and such constructions permit the curb box to be readily positioned on the subterranean pipe system. However, as such prior art "snap-on" curb box constructions engage the cylindrical pipe their resistance to rotation or tilting relative to the conduit system is minimal even though such prior devices do provide adequate resistance to vertical movement. Examples of such prior art devices are shown in U.S. Pat. Nos. 3,601,143 and 4,030,519. As such prior devices engage the circular configuration of the pipe little resistance to rotation of the curb box about the axis of the pipe is presented, and it is necessary for an operator to hold the curb box a vertical orientation during back filling to insure the proper curb box final position while being covered.

It is an object of the invention to provide a service line curb box of synthetic material which frictionally engages a valve housing adjacent the valve operator at a non-circular cross sectional portion of the conduit system wherein such frictional engagement resists vertical displacement of the curb box relative to the valve, and simultaneously resists rotational curb box rotation about the axis of the valve associated therewith.

It is an additional object of the invention to provide a synthetic plastic curb box having a bell housing which frictionally grips the sides of a valve housing, may be readily placed upon the valve by a vertical downward movement, and wherein the configuration of the bell housing engages the earth adjacent the valve such that downward vertical forces are resisted by the housing and not imposed upon the valve.

A further object of the invention is to provide a synthetic material curb box which includes relatively complex configurations, yet be economically produced by inexpensive molding techniques.

In the practice of the invention a synthetic plastic curb box lower portion includes a cylindrical upper portion for telescopingly receiving the upper curb box portion and a lower bell housing adapted to receive a subterranean conduit system valve. The housing includes arched openings intersecting the open lower end whereby the pipe associated with the valve enters the housing. The opposite sides of the bell housing are provided with inwardly extending projections of similar configuration opposed to each other, and including valve engaging surfaces which, normally, are spaced apart a distance slightly less than the dimension of the valve surfaces which they engage. Also, the housing projections include obliquely oriented cam surfaces defined upon bosses which aid in opening the bell housing to receive the valve, and provide additional frictional resistance to removal of the curb box from the valve.

The curb box is installed by forcing the curb box over the valve causing the bell housing to open or spread, and as surfaces defined upon the projections frictionally engage the valve at a non-circular transverse cross sectional location relative rotation of the curb box and valve is resisted.

The projections are formed in such a manner on the bell housing that surfaces thereof will engage the earth adjacent the valve for supporting the curb box, and directly transmitting vertical forces imposed upon the curb box to the earth, rather than upon the valve or conduit system.

BRIEF DESCRIPTION OF THE DRAWINGS

The aforementioned objects and advantages of the invention will be appreciated from the following description and accompanying drawings wherein:

FIG. 1 is an elevational view of a curb box constructed in accord with the invention, the valve being shown within the curb box in dotted lines, FIG. 2 is an end view of the curb box shown in FIG. 1, the valve being omitted, FIG. 3 is a top plan view as taken from the top of FIG. 1, FIG. 4 is a bottom view of the curb box, FIG. 5 is a partial, elevational, sectional view taken through the bell housing along Section V—V of FIG. 1, the valve being omitted, and FIG. 6 is a partial, elevational, sectional view as taken along Section VI—VI of FIG. 1, the valve being illustrated.

DESCRIPTION OF THE PREFERRED EMBODIMENT

As the inventive concepts pertain only to the lower portion of a total curb box assembly only the curb box lower portion is shown in the drawings, such lower portion being identified at 10. The complete curb box assembly includes an upper portion and cover, not shown, which is telescopically received within the lower portion 10 in the manner which will be appreciated from the assignee's U.S. Pat. No. 3,548,864.

The lower curb box portion 10 includes a cylindrical stem or column 12 having friction producing embossments and slots formed in the upper end as represented at 14. The lower end of the portion 10 is defined by the tubular bell housing 16 which encompasses the valve of the conduit system being serviced.

The bell housing 16 is of a generally rectangular configuration including side walls 18 and end walls 20. The walls extend to the lower end of the housing terminating at a lower edge 22 wherein the lower end of the bell housing is open. The side walls 18 are of a generally planar configuration at their upper portion 24, and the lower portion thereof consists of the friction producing projections for engaging the valve, as will be later described. The housing end walls 20 are provided with embossments of various dimensions whereby such embossments may be cut at the desired location to form archway type openings as at 26 for receiving the pipe of the conduit service line, as shown in U.S. Pat. No. 3,548,864. Thus, it will be appreciated that an arched opening 26 is defined in each of the end walls 20 having a dimension larger than the pipe of the conduit line, and intersecting the housing lower edge 22.

The valve engaging projections defined on the side walls 18 are of a configuration best appreciated from FIGS. 1, 4, 5 and 6. Each side wall includes a pair of projections each generally indicated at 28. Each projection 28 extends inwardly and includes an upper portion forming a relatively flat surface 30, and a lower portion which extends inwardly a greater distance than the surface 30 forming an apex 32. The apex 32 is defined by the inclined cam surface 34 at its lower region, and an inclined surface 36 is defined at the peak upper region. The surface 34 extends substantially to the housing lower edge 22, however a shoulder 38 is defined short of the edge 22.

Intermediate the projections 28 defined upon a common side wall 18 a vertically extending rib 40 is formed separating the projections and adding strength and rigidity to the housing configuration. The ridge 40 is inwardly oriented with respect to the side walls 18, but to a much lesser extent than the surfaces 30 as will be appreciated from FIG. 5.

In use, after the housing end wall embossments have been severed as desired to provide the proper dimension of arched openings 26, the bell housing 16 is placed upon a service line valve 42, as shown in FIGS. 1 and 6, wherein the valve is located intermediate the conduit system pipes 44. The upper region of the valve 42 includes an upwardly extending portion 46 through which the valve operator 48 projects, the operator 48 being accessible through the stem 12 upon the insertion of a wrench through the stem in the known manner.

When placing the curb box housing 16 on the valve 42 the cam surfaces 34 will initially engage the sides of the valve, and upon downward force being applied to the curb box the inclined surfaces 34 will force apart the projections 28 and sides 18 due to the resilient nature of the synthetic plastic material of the bell housing 16. Such downward force and movement continues until the apexes 32 pass over the horizontal center of the valve 42 and continued downward movement now permits the apexes 32 to move toward each other until the surfaces 30 engage the valve sides as shown in FIG. 6. The normal spacing between opposed flat surfaces 30, as shown in FIG. 5, is slightly less than the diameter of the valve 42 wherein, during installation, the surfaces 30 will be forced into a frictional engagement with the valve sides in the relationship shown in FIG. 6. The flat surfaces 30 extend upwardly a sufficient extent as to be disposed adjacent the valve portion 46 wherein any tendency for the curb box to rotate about the axis of the pipes and valve tends to "cam" the opposed projections 28 away from each other due to the non-circular configuration of the valve, and such rotational displacement is resisted by the material of the bell housing. Thus, the configuration of the projections 28 in association with the non-cylindrical configuration of the valve 42 assures that the curb box will be held in a vertical orientation, once installed, and only minimal attention need to be paid to the curb box during back filling.

Usually, vertical clearance exists between the top of the pipe 44 and the openings 26, and during the back filling and installation earth normally engages the projection surfaces 34, as well as the lower edge 22 of the housing. Thus, the surfaces 34, and the edge 22, as well as the shoulder 38, all support the curb box upon the earth within the trench, and vertical forces imposed upon the curb box portion 10 are primarily absorbed by the earth, rather than the valve 42 or associated pipe 44.

If it is desired to remove the curb box portion 10 from the valve 42, once installed thereon, such removal, can be accomplished by exerting an upward vertical pull upon the curb box and spread the housing sides, such as during installation.

By using a bell housing of a rectangular configuration and employing valve supporting projections of the disclosed type several important advantages are achieved. First, the rectangular form resists rotation of the curb box due to the surrounding earth, and thus, likelihood of horizontal torsional forces being applied to the valve is reduced. Secondly, when the trench is back filled the earth forces bearing on side walls 18 increases the frictional engagement of the curb box on the valve which is helpful in assuring that the box portion 10 will settle if the valve and conduits settle, and also, the firm frictional support of the valve will hold the valve in the proper orientation within the curb box, which is particularly important with plastic conduit systems.

It is appreciated that various modifications to the inventive concepts may be apparent to those skilled in the art without departing from the spirit and scope of the invention.

We claim:

1. A curb box for underground valves having a valve body including an elongated tubular stem having a lower end formed of a resilient synthetic material defining a valve receiving bell housing, said bell housing having an open lower end, end walls, side walls intermediate said end walls, and openings defined in said end walls intersecting said open lower end for receiving valve structure, the improvement comprising a projection defined upon each bell housing side wall homogeneously formed of the associated side wall material and extending toward each other into the chamber defined by the side and end walls, each projection including a valve body engaging surface, an inwardly extending apex adjacent each surface located vertically therebelow and a cam surface below said apex obliquely disposed to the vertical, said projections frictionally engaging the sides of a valve body upon the bell housing being placed upon a valve through said open lower end, the normal spacing between opposed projection valve body engaging surfaces being less than the dimension of the valve body engaged thereby whereby the bell housing side walls are biased transversely of the valve body by engagement of said projections with the valve body increasing the frictional engagement of said projections and the valve body, said cam surfaces engaging the valve body and biasing said projections and side walls outwardly as the bell housing is lowered upon the valve until said apexes pass over the valve body and are disposed thereunder.

* * * * *